United States Patent [19]

Pietras

[11] Patent Number: 4,739,681

[45] Date of Patent: Apr. 26, 1988

[54] MACHINE FOR MAKING UP AND BREAKING OUT PIPE JOINTS

[75] Inventor: Bernd G. Pietras, Wedemark, Fed. Rep. of Germany

[73] Assignee: Weatherford Oil Tool GmbH, Langenhagen, Fed. Rep. of Germany

[21] Appl. No.: 934,842

[22] Filed: Nov. 25, 1986

[30] Foreign Application Priority Data

Nov. 27, 1985 [DE] Fed. Rep. of Germany ....... 3541922

[51] Int. Cl.$^4$ .............................................. B25B 17/00
[52] U.S. Cl. ................................... 81/57.16; 81/57.34
[58] Field of Search ................. 81/57.11, 57.14, 57.16, 81/57.2, 57.3, 57.21, 57.34, 57.36

[56] References Cited

U.S. PATENT DOCUMENTS

| | | | |
|---|---|---|---|
| 3,518,903 | 7/1970 | Ham et al. | 81/57.16 |
| 3,902,385 | 9/1975 | Haby | 81/57.36 |
| 4,348,920 | 9/1982 | Boyadjieft | 81/57.16 |

*Primary Examiner*—Frederick R. Schmidt
*Assistant Examiner*—Robert Showalter
*Attorney, Agent, or Firm*—Peter K. Kontler

[57] ABSTRACT

A machine for clamping a pipe socket between clamping jaws of a socket screwing-on machine as a function of torque wherein, the clamping jaws of the screwing head are advanced to the socket via a thrust-crank drive of adjustable effective range. Without the need to exchange clamping jaws and other associated parts, it is possible to cover a large clamping range, and the clamping force which increases with the torque can be adjusted.

18 Claims, 6 Drawing Sheets

MACHINE FOR MAKING UP AND BREAKING OUT PIPE JOINTS

BACKGROUND OF THE INVENTION

The invention relates to a machine which is intended for clamping a pipe socket between clamping jaws of a socket screwing-on machine as a function of torque and which consists of a screwing head for clamping and screwing on the socket and of locking tongs fixing the pipe and intended for making screw connections between pipes used especially in the petroleum industry.

On screw-coupling equipment in the petroleum industry, especially on socket screwing-on machines or screw-coupling tongs, clamping systems which clamp nonpositively the article to be clamped and which transmit high torques are used. With an increasing depth and consequently a higher load exerted on the oil-field pipes used, the quality of the screw connection between the socket and the pipe must be improved. The quality of the screw connection is characterized by two features:

1. Obtaining an ideal prestress in the threaded connection,
2. Only slight damage to the pipe and to the socket during the screwing operation.

The screwing torque serves to indicate an ideal prestress in the threaded connection. However, it can serve as an indication of a screw connection of high quality only when the socket has been clamped correctly during the screwing operation. If clamping systems which clamp the pipe socket with a maximum clamping force before the start of screwing are used, the socket experiences elastic deformation. In this case, when the socket is screwed onto the pipe, the theoretical screwing torque is reached sooner than the necessary prestress built up in the threaded connection. In torque-dependent clamping systems, the clamping force increases only when the pipe piece is screwed into the socket. This counteracts a relatively high elastic deformation. The mechanical clamping systems can therefore be divided into two main groups:

1. Clamping systems with a clamping force independent of the torque,
2. Clamping systems with a clamping force dependent on the torque.

The torque-dependent clamping systems are favorable for achieving a high screw-connection quality.

For transmitting the clamping force directly to the socket, all the clamping systems use clamping jaws (clamping pistons) with hardened incorporated or exchangeable knives. In all clamping systems with a torque-dependent clamping force, the peripheral force of the driving torque acts on the clamping jaws via cams or in conjunction with gearwheels and levers and generates the torque-dependent clamping forces.

In many clamping systems, a relative movement resulting in pronounced clamping scores on the socket occurs during the clamping operation between the socket and the clamping jaws. The pipe surface thus acts as a transmission element in the clamping system.

Both clamping systems requiring separate clamping jaws for each socket diameter and clamping systems which, equipped with a single set of clamping means, can clamp sockets of slightly differing diameters are known. The clamping systems known hitherto work in both directions of rotation only when the clamping elements are replaced or changed over.

OBJECTS AND SUMMARY OF THE INVENTION

An object of the invention is to design a machine for making up and breaking out pipe joints so that, without the need to exchange the clamping jaws, sockets of diameters differing considerably from one another can be clamped by means of clamping forces changing as a function of the torque. Moreover, clamping will be possible independently of the direction of rotation, without the need to change or replace components. The invention resides in that the clamping jaws of the screwing head for clamping and screwing on the socket are advanced to the latter via thrust-crank drives of adjustable effective range which can be driven by means of the torque which triggers the rotary movement of the screwing head.

It is possible to cover a wide clamping range without the need to exchange clamping jaws. The maximum value of the clamping force which increases with the torque can be adjusted. Both plastic sockets and steel sockets can be clamped by adjusting the clamping force accordingly. Because the clamping jaws are attached to the socket without any relative movements, the latter is not damaged. The clamping jaws are subjected to uniform loads and achieve long service lives. The sockets can be introduced easily through the large orifice which can be obtained in the unclamped state. Pulsating forces of inertia are prevented because of precise true running. The clamping function is independent of rotation to the right or to the left without the need to change over or replace components.

DESCRIPTION OF THE PREFERRED EMBODIMENTS

In the Figures of the drawing, the following reference numerals denote to the following components:

1 Machine base frame
2 Socket-clamping device
3 Locking tongs
4 Housing of the socket-clamping device 2
5a–c Hydraulic drive motors for the socket-screwing head 10 in the socket-clamping device 2
6 Mounting plate for the clamping head of the locking tongs 3
7 Mounting-plate legs
8a Clamping-head front plate of the locking tongs 3
8b Clamping-head back plate of the locking tongs 3
9a–c Clamping cylinders of the locking tongs 10 Socket-screwing head
11 Brake drum of the socket-screwing head 10
12 Eccentric shaft of the socket-screwing head 10
12a Eccentric-shaft journal
13 Drive wheel of the eccentric shaft (planet wheel)
14 Clamping-jaw connecting rod
15 Ball thrust piece into which the clamping-jaw connecting rod 14 can be screwed
16 Hexagon socket of the ball thrust piece
17 Bearing block for the ball thrust piece
18 Retaining disk
19 Clamping-jaw guide piece
20 Inclined rocker bearings of the clamping jaws
21a-c Clamping jaws with gripping knives
22 Eccentric-shaft bearing
23 Driving plate
23a Driver
24a,b Stop screws for the driver 23a
24c Threaded bore for stop screws 24a and 24b
25 Fastening screws for retaining washer 27
26 Rubber spring
27 Retaining washer
28 Gearwheel (sun wheel)
28a,b Teeth of the gearwheel 28
29 Drive pinion
30a,b Rolling bearings of the gearwheel 28
31 Fixed supporting ring for the gearwheel
32 Supporting ring for the socket-screwing head
33a-d Guide rollers for the clamping-jaw guide piece
34 Sliding faces of the guide rollers 33
35 Slot in the housing 4
36 Indicator pin
37 Indicator scale for the position of the clamping jaws
38 Indicator scale for the position of the eccentric shaft
39 Screwing-head brake
40 Jaw guidepiece of the locking tongs
41 Rocker bearing in the jaw guidepiece 40
42a-c Clamping jaws with gripping knives of the locking tongs
43 Inclined rocker bearing of the clamping jaws of the locking tongs
44 Lever arm of the locking-tongs clamping head for the follow-up cylinder 45
45 Follow-up cylinder
46 Rotary pivot pin of the piston rod of the follow-up cylinder
47 Rotary pivot pin of the follow-up cylinder
48 Guide rollers for the jaw guidepiece 40 for guiding the clamping jaws of the locking tongs
49 Sliding faces of the guide rollers 48
50 Rolling bearing of the locking-tongs clamping head
51 Pressure-oil line for the drive motors 5a-c
52 Tank line for the drive motors 5a-c
53,53 Pressure-oil feed lines for the two directions of rotation of the drive motors
55 Oil-leakage line of the motor 5a
56 Oil-leakage line of the motors 5b and 5c
57,58,59 Hydraulic directional valves
60 Hydraulic pressure-reducing valve
61 Pressure-oil line for the follow-up cylinder 45
62 Tank line for the follow-up cylinder 45
63 Hydraulic directional valve for the follow-up cylinder 45
64 Flow valve for the follow-up cylinder 45

A socket-clamping device 2 and locking tongs 3 are arranged on a machine base frame 1. Together they form a socket screwing-on machine. Mounted in a housing 4 of the socket-clamping device are three hydraulic drive motors 5a to 5c which can rotate the socket-screwing head 10 equipped with clamping jaws 21a to 21c for executing screwing movements. To clamp a pipe socket (other joint part), the latter is first guided into the central clamping orifice of the socket-screwing head. When the hydraulic drive motors designed as axial piston motors are started, toothed pinions 29 begin to rotate a gearwheel 28 having two sets of teeth 28a and 28b. The teeth 28b mate with drive wheels 13 of eccentric shafts or eccentrics 12. By means of a brake shoe 39 which exerts constant friction on a brake drum 11, the eccentric shafts 12 can be rotated until the clamping jaws 21a to 21c grasp the pipe socket. As a result of the rotation of the eccentric shafts, clamping-jaw connecting rods 14 are pivoted. They thus advance the clamping jaws to the socket surface via ball thrust pieces 15. As soon as the gripping knives (not shown in detail) which are mounted in the clamping jaws, have grasped the pipe socket, the rotational resistance of the eccentric shafts becomes so high that the frictional resistance between the brake drum 11 and the brake lining of the friction brake shoe 39 is overcome and the entire socket-screwing head 10, together with the clamping jaws mounted in it, the eccentric shafts and all the remaining connecting parts, is rotated. The drive wheels 13 of the eccentric shafts thereby circle the set of teeth 28b of the gearwheel 28, that is to say they form planet wheels in this transmission system, whilst the gearwheel 28 forms the sun wheel. The eccentric shafts 12 form central thrust-crank mechanisms with the clamping-jaw connecting rod sections 14 and with clamping-jaw guide pieces 19. Thus, when the socket-screwing head is stationary, these thrust-crank mechanisms driving the individual clamping jaws 21a-c radially can be moved to and fro. Since the torque transmission is directed via the drive wheels 13 of the eccentric shafts, the clamping force is dependent on the torque exerted on the socket-screwing head, that is to say on the screwing torque.

The magnitude of the clamping force is determined by the crank angle of the above-mentioned thrust-crank mechanism, consisting of the eccentric shaft, the clamping-jaw connecting rod sections and the jaw guidepiece, and by the drive torque. The clamping force can theoretically be infinitely high when a connecting rod section 14 of the thrust-crank mechanism is brought into the covering or extended position during clamping. The effective length of each composite connecting rod 14,15 can be varied as a result of rotation on the threaded thrust piece or connecting rod section 15. Because of this adjustability, the clamping jaws can be matched continuously to the socket diameter. Furthermore, during clamping, the crank angle on the thrust-crank mechanism can be adjusted as desired by means of the threaded thrust piece 15, that is to say the clamping force can thus be matched to the type of socket.

When the direction of rotation of the drive is changed, the clamping jaws are released and lifted off the socket, in order thereafter to clamp again after executing the maximum stroke. The clamping system can thus transmit left or right torques as a function of the direction of rotation of the drive.

Figure 1:
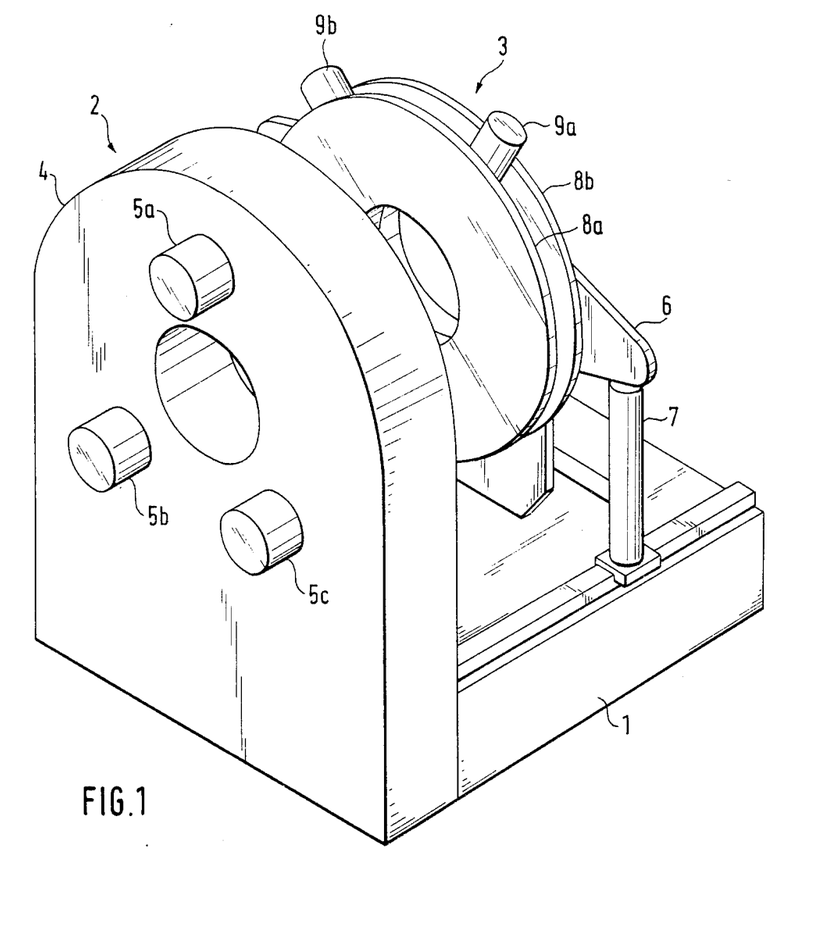
FIG. 1 is a diagrammatic perspective view of the improved machine.
Figure 2:
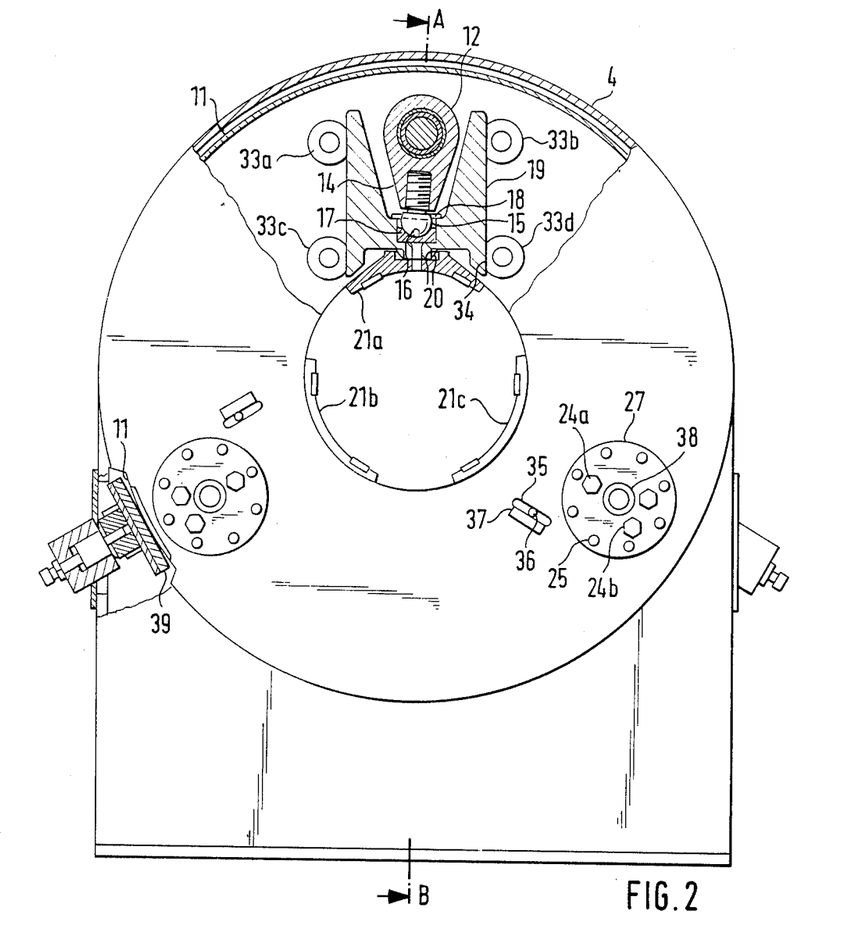
FIG. 2 is a side elevational view of the socket-screwing head partly in section.
Figure 3:
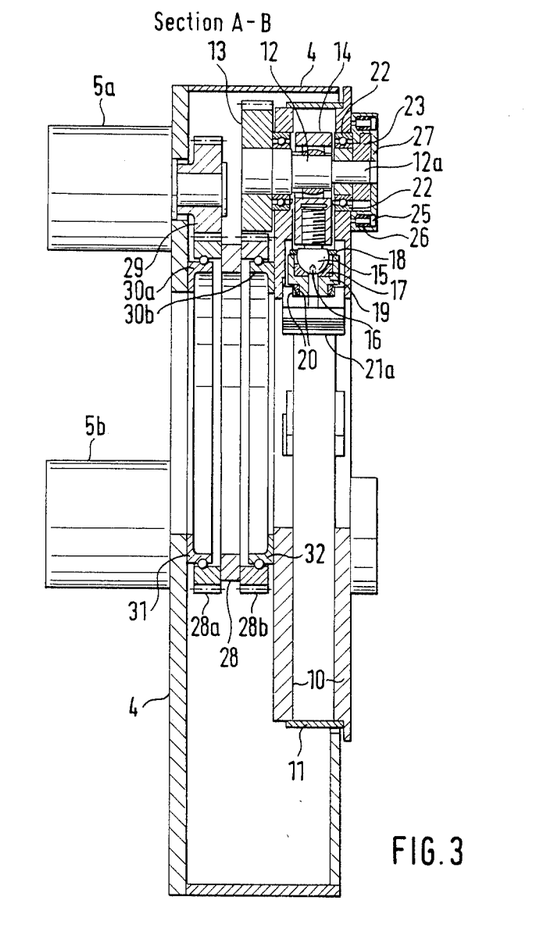
FIG. 3 is an axial sectional view of the socket-screwing head according to FIG. 2.
Figure 3A:
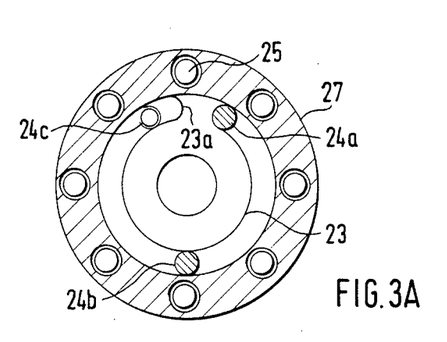
FIG. 3a is a sectional view of the device for limiting the angle of the eccentric shaft.
Figure 4:
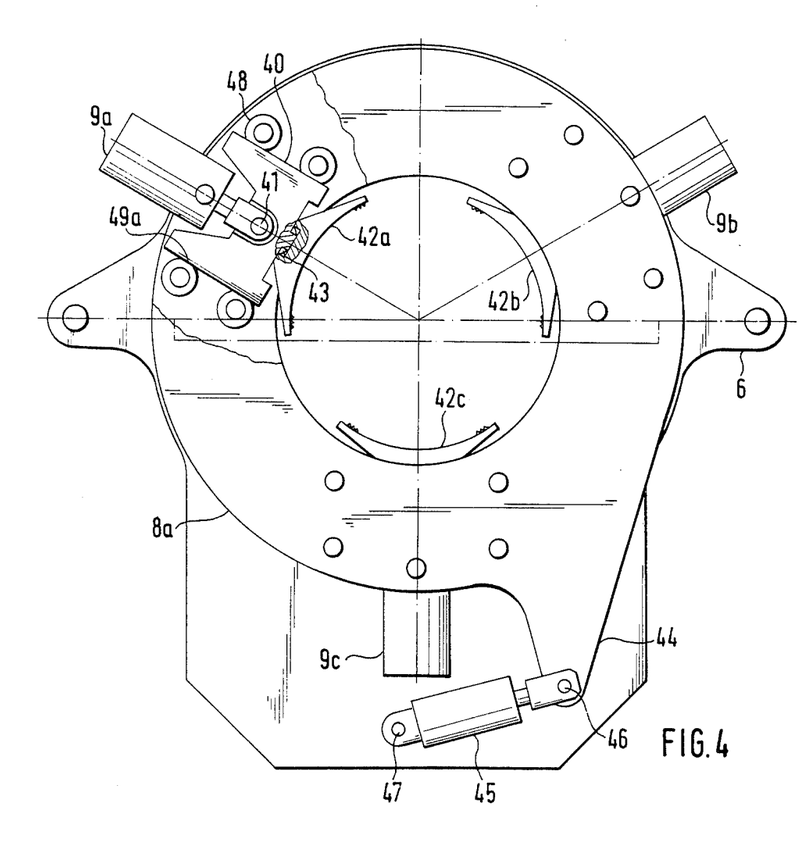
FIG. 4 is a side elevational view of the screwing head of the locking tongs partly in section.
Figure 5:
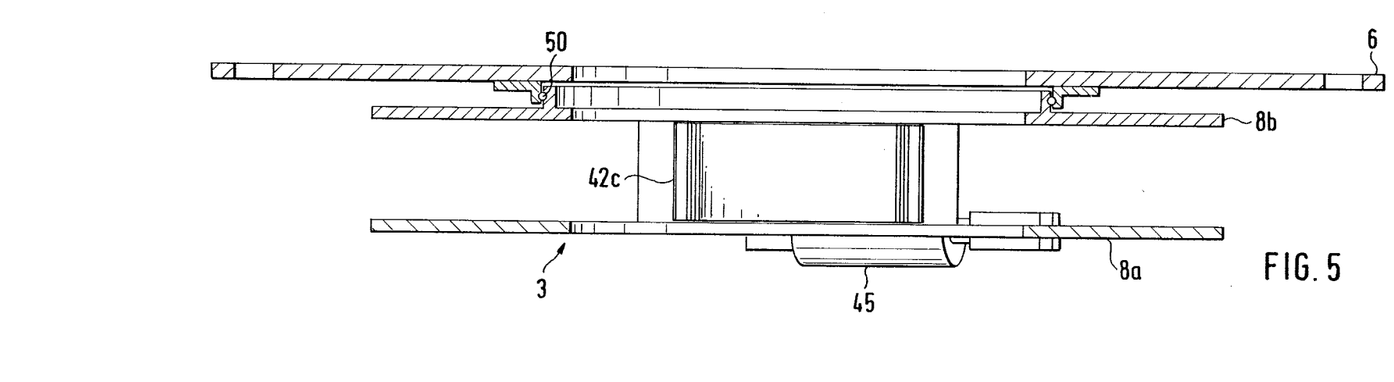
FIG. 5 is an axial sectional view of the locking tongs.

To prevent the socket to be clamped from being damaged as a result of an excessively high clamping force, there is a crank-angle limiter consisting of a driving plate-like projection 23 with a driver 23a which can be pivoted to and fro between stop screws 24a and 24b. The eccentric shaft is thereby prevented from assuming a position which would lead to an extended alignment of the clamping-jaw connecting rod section 14 and the thrust piece 15 and consequently to an excessively high clamping force. The driving projection 23 is pushed onto an end position 12a of the eccentric shaft which is designed as a stub journal. The stop screws 24a and 24b can transmit the impact force to a retaining washer 27 fastened to the socket-screwing head 10 by means of fastening screws 25. Rubber springs 26 serve for damping the impact energy.

The angle limiter can be adjusted so that either only right-hand screwing or only left-hand screwing can be carried out and the clamping system stops when it has opened to the maximum opening width.

Since the clamping jaws are connected to their guide pieces 19 via inclined rocker bearings 20, they swing into alignment with the socket surface during the clamping operation. The locking tongs 3 are equipped with radially arranged clamping cylinders 9a to 9c to clamping the pipe (one joint part), onto which the socket is to be screwed. To transmit perfect radially directed clamping forces to the pipe, clamping-jaw guide pieces 40 are connected in an articulated manner to the piston rods of clamping cylinders 9a–9c via rocker bearings 41 and also to clamping jaws 42a–42c via inclined rocker bearings 43.

In the screwing of shoulder threads, the screwing torque increases abruptly in the last screwing phase, that is to say immediately when the shoulder abutment is reached. To obtain a precise screwing torque, the screwing drive has to be switched off very quickly. The quality of the screw connection is higher if the screwing torque can act statically for a longer time on the threaded connection. Hydraulic screw machines cannot maintain a torque statically for a period of time, once it has been achieved, since the static friction in the hydraulic drive takes effect. The static friction can be overcome by increasing the pressure, but the drive rotates the threaded connection further and then stops once again. To eliminate these disadvantages, the locking tongs 3 are equipped with a follow-up device consisting of a hydraulic cylinder 45 having a movable portion which engages in an articulated manner a lever arm 44 of the clamping-head front plate 8a and a portion secured to a fixed pivot pin 47. The follow-up device can be operated in three different ways, the follow-up speed being adjustable by a flow valve 64 of the follow-up hydraulics:

Case I

The angular speed of the screwing head of the locking tongs is equal to the angular follow-up speed. When the follow-up device is switched on, the relative speed between the thread shoulders of the parts to be screwed together is zero. The torque can be maintained during the follow-up time. The holding time is dependent on the follow-up angle and on the screwing speed.

Case II

The angular speed of the screwing head is higher than the angular follow-up speed. When the follow-up device is switched on at this setting, the relative angular speed between the thread shoulders decreases. The torque increases more slowly, thus gaining time for switching off the screwing drive.

Case III

The angular speed of the screwing head is lower than the angular follow-up speed. At this setting, the torque can be cut out quickly. When the follow-up device 45 is switched on, the torque decreases very rapidly until the maximum follow-up angle is reached. During the follow-up, there is sufficient time to switch off the screwing drive. This rapid cut-out is independent of the forces of inertia of the screwing drive.

Figure 7:
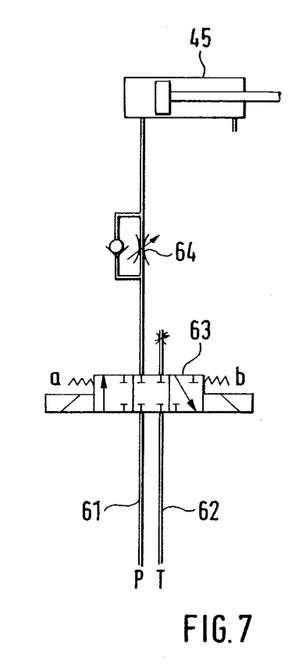
FIG. 7 is a simplified representation of the controls for the follow-up device for the screwing head of the locking tongs.

To activate the follow-up device 45, the follow-up cylinder is extended by moving a 4/3-way directional valve 63 into the switching position a (FIG. 7). When the set torque is reached in the threaded connection, that is to say when, in shoulder connections, the thread shoulders abut against one another or shortly before this, the directional valve 63 is brought into the switching position b. Since the peripheral force of the applied torque acts on the follow-up cylinder, the follow-up cylinder piston is retracted and at the same time overcomes the resistance generated by the flow valve 64. As a result, the very steep rise of the torque can be reduced or even a constant torque can be maintained without a rise. In this case, the screwing-head speed and the follow-up speed are the same. The retraction speed can be set by means of the flow valve 64, since the cylinder oil has to pass through the flow valve.

If the follow-up device is activated when the socket-screwing head and the screwing head of the locking tongs are in the position of rest, that is to say the threaded connection is held clamped, the follow-up cylinder can release (break) the firmly screwed threaded connections.

In the example illustrated, the drive motors (axial piston motors) 5a to 5c are fed from a common pressure source via pressure-oil feed lines 51, 53 and 54. Three directional valves 57, 58 and 59 and a pressure-reducing valve 60 ensure the control of the motors. In the switching position shown (FIG. 6), the drive motors are stopped, since the working lines (pressure-oil feed lines 53, 54) are connected to a tank line 52. The motors 5b and 5c are subjected to a pressure of 1 bar by the pressure-reducing valve 60 and the 4/2-way valve 59 via an oil-leakage line 56 in the housing. The housing pressure, in conjunction with the short-circuiting of the working lines 53 and 54 leading to the motors 5b and 5c, produces a free-running circuit. In this case, when the valve 57 is switched to the position a or b, the motor 5a rotates to the left or right. All the oil from a pressure source P thereby only flows through the motor 5a. Consequently, the screwing head can reach a high speed, whilst preserving a low torque.

Figure 6:
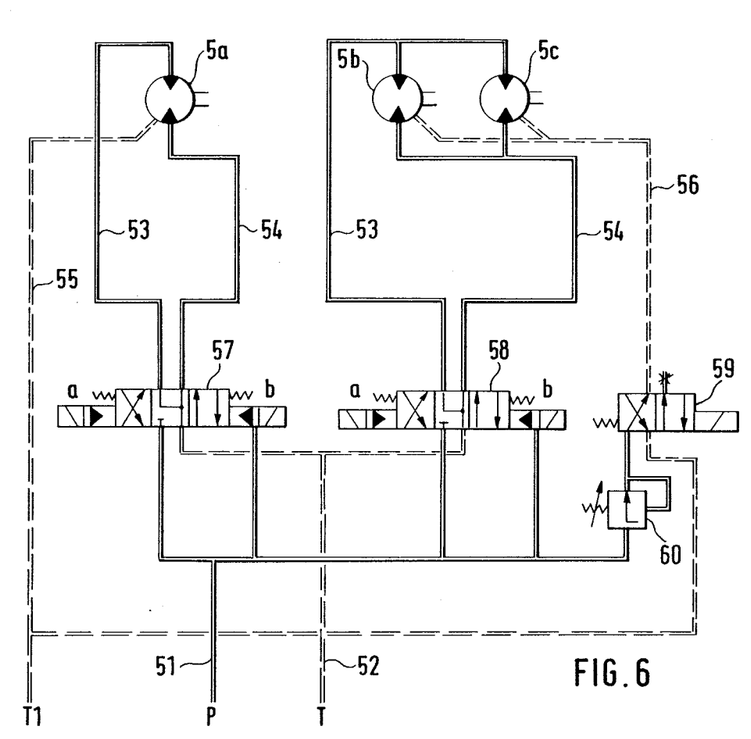
FIG. 6 is a simplified circuit diagram of the controls for the hydraulic drive motors of the socket-screwing head.

When the valve 59 is actuated at the same time as the valves 57 and 58 so that all the motors are fed from the pressure source P, the screwing head reaches a lower speed, but a very high torque.

As a result of the two possible switching positions a and b of the valves 57 and 58, the motors can be rotated to the right or to the left.

I claim:

1. A machine for making up and breaking out pipe joints which are composed of threaded male and female joint parts, comprising a locking device for non-rotatably holding one of the joint parts; a rotary head arranged to surround the other of the joint parts; a plurality of clamping jaws movably mounted in and rotatable with the head; adjustable thrust crank mechanisms provided in said head, one for each of said jaws and each operable to move the respective jaw relative to said head toward and from clamping engagement with the other joint part; and means for operating said mechanisms and for rotating said head and said jaws in response to engagement of the jaws with the other joint part so that the other joint part rotates with the head relative to the one joint part each of said mechanisms comprising an eccentric rotatable by said operating means and a connecting rod of variable effective length, said connecting rod being movable by said eccentric and being arranged to transmit motion to the respective jaw.

2. The machine of claim 1, wherein said locking device comprises locking tongs for the one joint part, said locking tongs being rotatable about the axis of said head so that said tongs tend to rotate with said head as a result of the establishment of a threaded connection between the joint parts, and further comprising a follow-up device having means for generating a reaction torque which limits the extent of rotation of said tongs with said head.

3. The machine of claim 2, wherein said follow-up device further includes means for varying said reaction torque.

4. The machine of claim 3, wherein said follow-up device further comprises a fluid-operated cylinder and piston unit, a source of pressurized fluid and means for connecting said source with said unit, said varying means including flow regulating valve means in said connecting means.

5. The machine of claim 2, wherein said follow-up device further comprises a fluid-operated motor having a fixedly mounted first portion and a movable second portion coupled to said tongs.

6. The machine of claim 1, further comprising rocker bearings interposed between said connecting rods and the respective jaws.

7. The machine of claim 1, wherein each of said connecting rods comprises a first section connected to the respective eccentric and a second section coupled to and movable relative to the first section to thereby vary the effective length of the connecting rod, each of said mechanisms further comprising guide means interposed between the respective second section and the corresponding jaw and a ball-and-socket joint interposed between the second section and the guide means.

8. The machine of claim 1, wherein said operating mean includes motor means and gear transmission means between said motor means and said eccentrics.

9. The machine of claim 8, wherein said transmission means includes a planetary including planet pinions drivingly connected with said eccentrics and mounted in said head, and a sun gear mating with said pinions and driven by said motor means, said head constituting the planet carrier of said planetary.

10. The machine of claim 1, wherein each of said connecting rods comprises two coaxial sections and means for moving one of said sections axially relative to the other section to thereby vary the effective length of the respective connecting rod.

11. The machine of claim 1, further comprising means for limiting the extent to which said eccentrics are rotatable by said operating means to thereby limit the magnitude of the force with which said jaws can engage the other joint part.

12. The machine of claim 11, wherein each of said limiting means comprises a projection provided on and rotatable with the respective eccentric and stop means provided in the path of movement of said projection.

13. The machine of claim 12, further comprising means for securing said projections to the respective eccentrics in any one of a plurality of different positions to thereby select the angular positions of said eccentrics when the respective projections engage the corresponding stop means.

14. The machine of claim 12, wherein said stop means are mounted on said head and further comprising damping means interposed between said stop means and said head.

15. The machine of claim 1, further comprising brake means for opposing rotation of said head while said jaws are disengaged from the other joint part.

16. The machine of claim 1, further comprising a housing rotatably mounting said head, said operating means including at least one motor mounted on said housing and planetary transmission means between said motor and said mechanisms.

17. The machine of claim 16, wherein said transmission means comprises a twin sun gear rotatably mounted in said housing, a second gear driven by said motor and mating with said twin sun gear, and planet pinions mating with said twin sun gear and each drivingly connected to one of said mechanisms.

18. The machine of claim 1, wherein said operating means comprises a plurality of hydraulic axial piston motors, a common source of hydraulic fluid for said motors, a directional valve disposed between said source and each of said motors, pressure reducing valve means between said source and said motors, and a common fluid leakage line connecting two of said motors with said source, one of said directional valves and said pressure reducing valve being installed in said fluid leakage line.

* * * * *